United States Patent [19]
Hoffman

[11] 4,293,233
[45] Oct. 6, 1981

[54] PRINTER CONTROL SYSTEM

[75] Inventor: Mark H. Hoffman, Huntsville, Ala.

[73] Assignee: SCI Systems, Inc., Huntsville, Ala.

[21] Appl. No.: 114,561

[22] Filed: Jan. 23, 1980

Related U.S. Application Data

[62] Division of Ser. No. 967,090, Dec. 6, 1978, Pat. No. 4,226,546.

[51] Int. Cl.$^3$ .............................................. B41J 1/30
[52] U.S. Cl. ........................... 400/144.2; 400/157.2; 400/157.3; 400/166; 101/93.03
[58] Field of Search .............. 400/144.2, 144.3, 157.2, 400/157.3, 166, 184; 101/93.03; 361/153, 154; 318/685, 696

[56] References Cited

U.S. PATENT DOCUMENTS

| | | | |
|---|---|---|---|
| 3,712,212 | 1/1973 | Beery | 101/93.03 |
| 3,746,959 | 7/1973 | Kobayashi et al. | 318/696 |
| 3,858,509 | 1/1975 | Grundhurr | 101/93.19 |
| 4,024,447 | 5/1977 | Epstein | 318/696 |
| 4,129,816 | 12/1978 | Feldy et al. | 318/696 |

*Primary Examiner*—Paul T. Sewell
*Attorney, Agent, or Firm*—Curtis, Morris & Safford

[57] ABSTRACT

The intermittent movement of the printer's carriage and "daisy"-type print wheel is controlled by a relatively simple, reliable digital control system. The difference between the desired velocity and the actual velocity of each member is measured digitally. This difference constitutes an error signal which is used to retrieve stored values of acceleration or deceleration corresponding to various values of the error signal. These values are used to develop a corresponding electrical signal which is used to accelerate or decelerate the member to reach the desired velocity. A relatively simple circuit is provided for reliably returning the carriage or print wheel to a desired position after overshooting the position, despite a relatively large amount of overshoot. Simple, low-power-consumption holding or drive circuits utilizing pulsed voltages are provided for the stepping motors used for ribbon feed and line feed, and for the solenoids used for ribbon shift, print wheel shift and print hammer energization. Digital control of the print hammer intensity is provided by controlling the duty cycle of the hammer energization signals in accordance with intensity values stored in memory.

4 Claims, 12 Drawing Figures

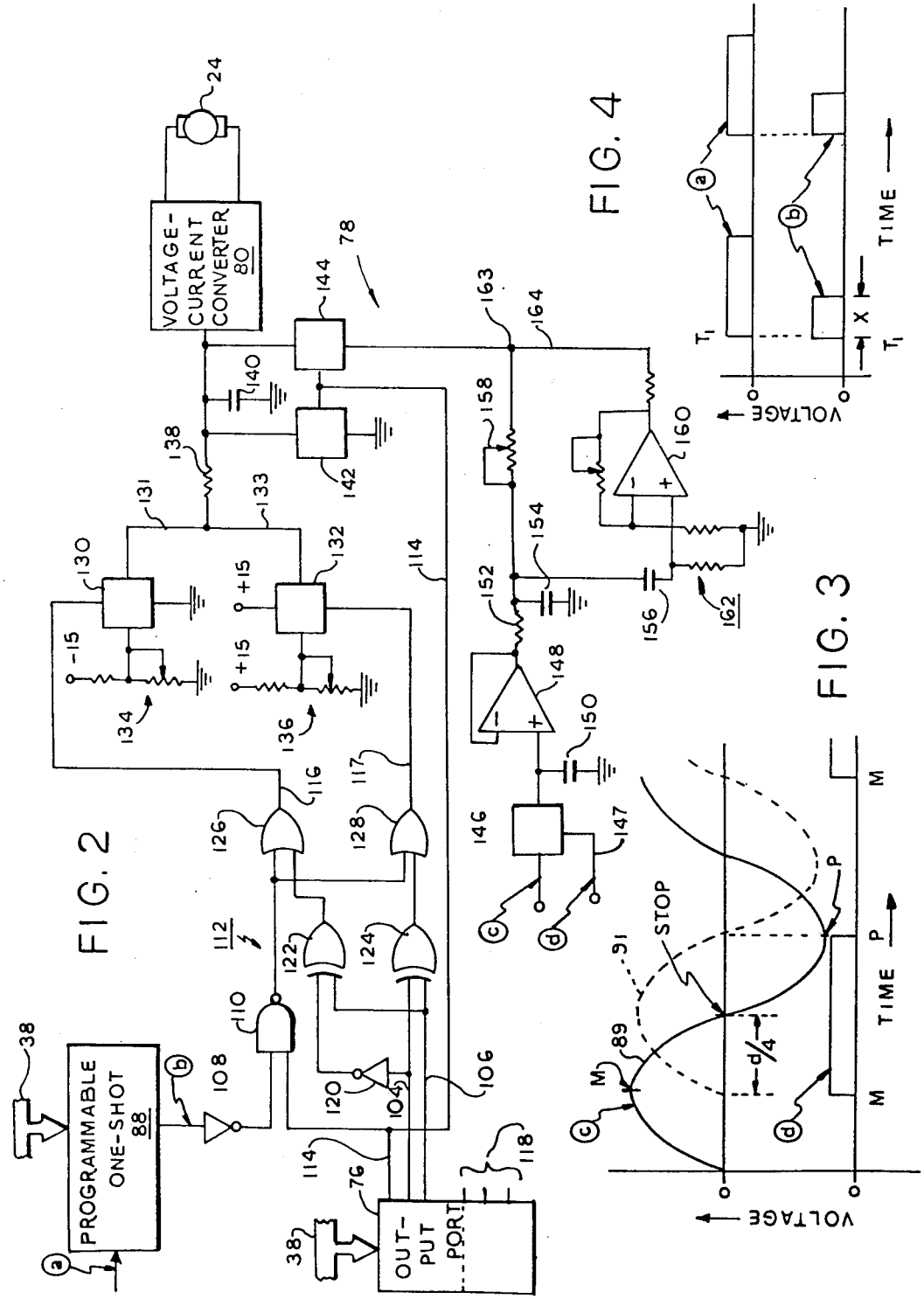

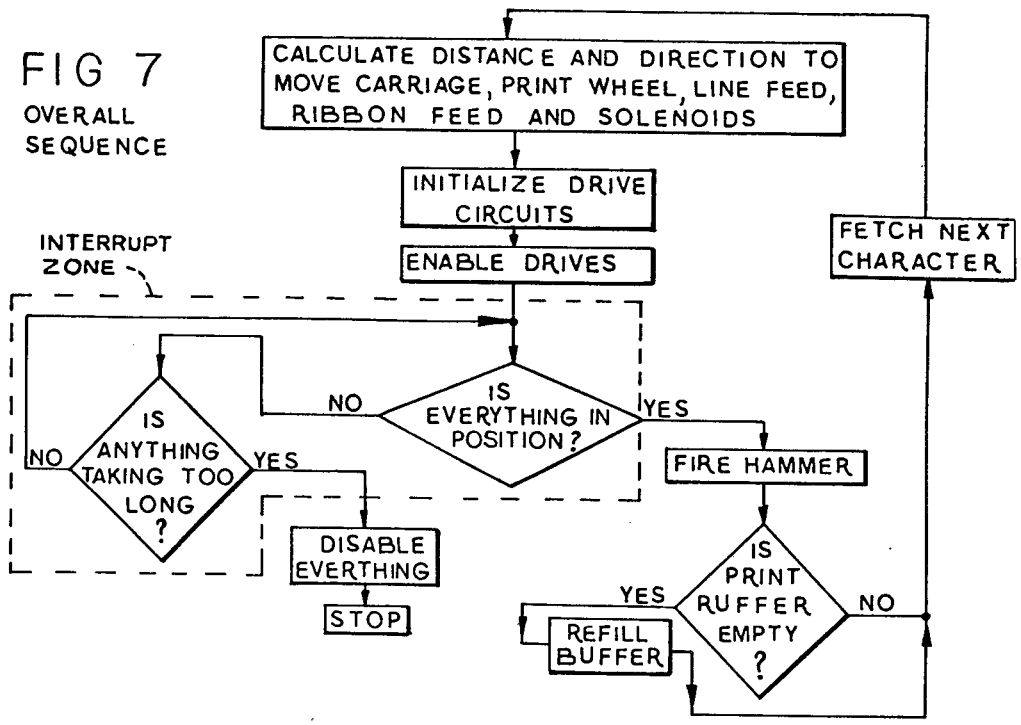
FIG 7 OVERALL SEQUENCE
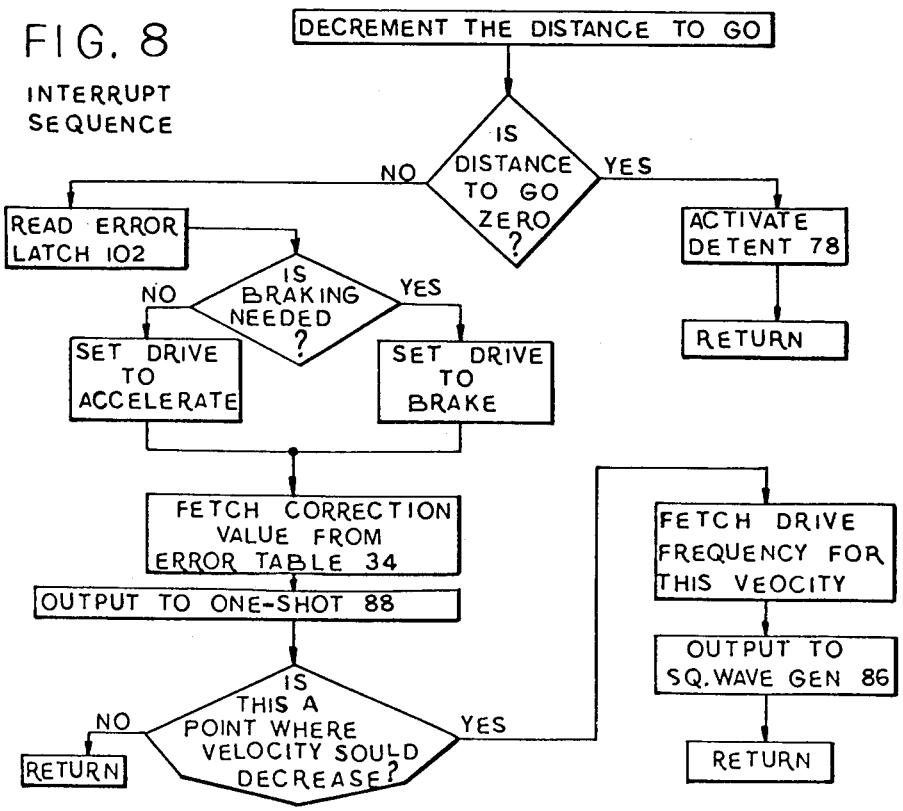
FIG. 8 INTERRUPT SEQUENCE

PRINTER CONTROL SYSTEM

This is a division of U.S. application Ser. No. 967,090, filed Dec. 6, 1978, now U.S. Pat. No. 4,226,546.

This invention relates to printers, and particularly to printers of the so-called "daisy wheel" variety. This invention also relates to a means and method for controlling the velocity of a driven member, in particular, the carriage and/or print wheel of a printer.

"Daisy wheel" and similar printers have achieved a certain degree of success in the printer field. They produce printing of typewriter quality at speeds considerably in excess of those at which a human operator can type. However, such printers are relatively costly, have relatively high electrical power requirements, and often are not satisfactorily reliable.

Accordingly, it is an object of the present invention to provide a control system for a printer of the daisy wheel or similar type. It is an object to provide such a control system which has considerably fewer parts, substantially fewer high-precision electrical components, and a lower manufacturing cost than previous control systems. It is also an object to provide such a system which uses and wastes less electrical power, and which has a higher degree of reliability.

The foregoing objects are met, in accordance with the present invention, by the provision of a control system for a printer in which the positioning of the carriage and the print element (preferably a rotary "daisy wheel") is controlled by digital rather than analog means. In the movement of the carriage or print wheel member, the instantaneous velocity of the moving member is sensed and compared with a desired velocity which is calculated so as to bring the member to its new resting position most quickly. Acceleration values are stored in a digital memory and are read out and used to produce a pre-determined amount of acceleration or deceleration of the members. By this means, the usual analog control circuitry is simplified or eliminated, and relatively high-precision, high-cost analog components are largely eliminated.

The solenoids used for ribbon shifting and print wheel shifting, as well as the ribbon and line feed stepping motors, have a need for steady-state energization even when they are not moving. In accordance with another feature of the invention, the applicant has recognized that the former method for supplying such steady-state energization is relatively inefficient, thus unnecessarily increasing operating costs, and generates a considerable amount of heat. This heat is believed to be deleterious to the life of some of the semi-conductor devices used in the electrical circuit. Applicant has greatly increased the efficiency and reduced the heat so generated by the use of pulsating holding signals to energize the solenoids and motors. The signals are designed to hold the solenoids and motors in their previous positions, and yet operate the power transistors at relatively high levels of efficiency.

Another contribution to high manufacturing cost and low efficiency is believed to lie in the usual energization of the printing hammer. Applicant minimizes such problems by using a pulsating drive signal for the hammer solenoid, with duty-cycle control to regulate the hammer impact. Preferably, impact values for different characters to be printed are stored in a digital memory and are used to control the drive signal duty cycle.

Another problem in prior printers is that when the print element or carriage overshoots the desired stopping location by a relatively large distance, the overshoot compensation circuit is not able to compensate for it, with the result that the printed characters are misaligned. Accordingly, another object of the invention is to increase the range of compensation of the printer for overshoot.

In accordance with a further feature of the present invention, the latter object is met by the provision of a sample-and-hold circuit for sampling the compensation signal just prior to the overshoot exceeding the normal range, and then using that retained signal to drive the member back to the desired location.

The foregoing and other objects and advantages of the invention will be set forth in or apparent from the following description and drawings:

In the drawings:

FIG. 2 is a detailed schematic circuit diagram of a portion of the control system shown in FIG. 1;

FIGS. 3 and 4 are waveform diagrams illustrating features of the operation of the system shown in FIG. 1;

FIG. 7 is a flow chart illustrating the overall sequence of operation of the system shown in FIG. 1;

FIG. 8 is another flow chart showing the sequence of events in an interrupt cycle forming a part of the overall sequence of operation of the control system shown in FIG. 1;

GENERAL DESCRIPTION

The mechanical features of a daisy-wheel printer are well known. Since they do not form a part of this invention, such mechanical features will not be described in detail here; they will be described only to the extent necessary to explain the operation of the control system.

Figure 1:
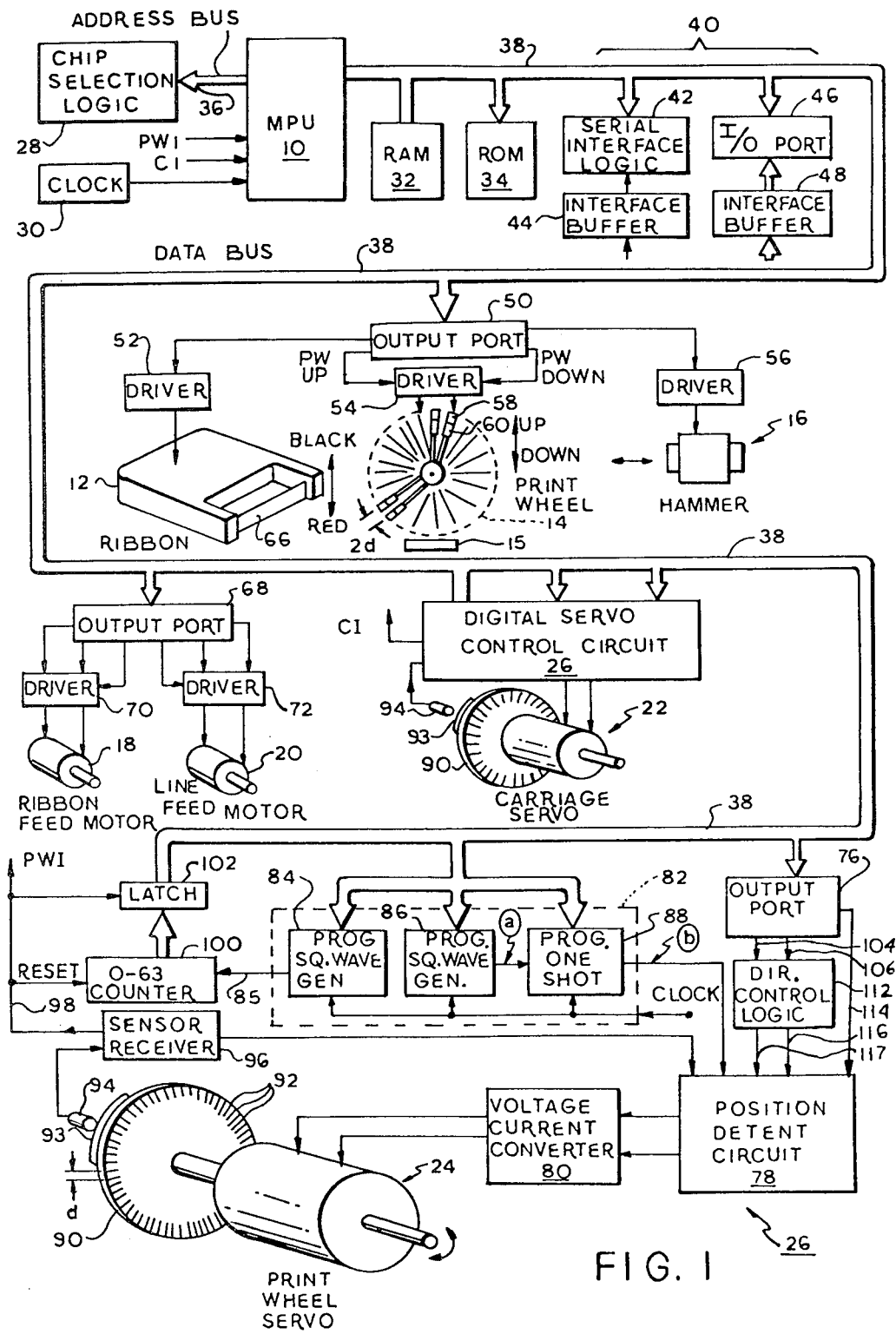
FIG. 1 is a schematic diagram of the control system of the present invention.

Referring now to FIG. 1, the control system includes a microprocessor unit ("MPU") 10 which is used in controlling the operation of a ribbon cartridge 12, a print wheel ("daisy" wheel) 14, and a hammer 16. As it is well known, the print wheel 14 is rotated quickly from an initial starting position to a position at which one of the print wheel members or "petals" is located between the hammer 16 and the paper (not shown). The hammer 16 is energized quickly so that it hits the print wheel element and drives it against the ribbon 66 to make an impression on the paper. After every impact of the hammer, the inked ribbon 66 in the cartridge 12 is moved by one increment by means of a ribbon-feed stepping motor 18 to bring a fresh portion of the ribbon into position for the printing of the next character.

The print wheel 14 is mounted on a carriage, indicated schematically at 15, which moves laterally back and forth across the paper. The print wheel 14 and the carriage 15 are driven along tracks by a carriage servo motor 22. A separate print wheel servo motor 24 is provided to rotate the print wheel to a desired location. Thus, the carriage servo motor 22 moves the print wheel and carriage to a printing location, where it stops. The print wheel moves the desired type member to the desired position, where it stops, and the hammer 16 is energized to print the character. This process is repeated until a full line of characters has been printed.

After each line of characters has been printed, a line-feed stepping motor 20 moves the paper by one line so that another line can be printed.

Referring again to FIG. 1, the microprocessor unit ("MPU") 10 is a standard, well-known product such as the model 8085A microprocessor sold by Intel Corporation. Data is input by means of an input system 40. Parallel-form data is received through an interface buffer 48 and an input/output port 46 and is conducted to the MPU 10 through a data bus 38. Serial-form data is received through an interface buffer 44 and conventional serial interface logic unit 42 over the same data bus 38.

Addresses for the various chips of the control system shown in FIG. 1 are stored in a chip selection logic circuit 28. Addressing information is communicated to the circuit 28 over an address bus 36.

An operating program for the microprocessor unit is stored in a portion of a read-only memory ("ROM") 34, which is connected to the data bus 38. A random-access memory 32 also is connected to the data bus 38 for use as a line buffer to store the characters for a complete line of printing, and for use in the computing process of the microprocessor. A clock source 30 supplies clock pulses at a one millisecond rate to the microprocessor unit to time the operational functions of the circuit. This is in addition to the internal clock forming an integral part of the microprocessor.

FIG. 7 illustrates the overall sequence of operation of the control system of FIG. 1. First the microprocessor calculates the distance and direction to move the carriage and the print wheel, and then determines whether and how much to operate the line feed mechanism, the ribbon feed mechanism, and the solenoids for operating the ribbon shift, print wheel shift and the hammer.

Next the drive circuits for the various mechanisms are initialized and enabled.

Next, a series of interrupt routines are conducted as illustrated by FIG. 8. In these routines, the control system determines the correct location for the carriage and print wheel and brings them to their desired positions in a manner to be described in greater detail below. Then, referring again to FIG. 7, when everything is in its correct position, the hammer 16 is energized to print the character. This process is repeated until all the characters in the line have been printed, at which point the line buffer is refilled in order to enable the printing of a subsequent line of characters. This procedure is repeated until the printing job is complete.

The details of the manner in which the microprocessor is used to perform the foregoing functions either are well known in the prior art, or are well within the skill of the art. For example, see U.S. Pat. No. 4,037,216 and the related patents and applications mentioned therein which describe the use of an Intel 8080 microprocessor in a daisy wheel printer. The programming and operation of the 8085A microprocessor is described in the "MCS-85 Users Manual" published by Intel Corporation, 1978, and other sources. For these reasons, the programming and operation of the microprocessor unit 10 will not be described in detail here.

DIGITAL SERVO CONTROL CIRCUIT

One of the features of the present invention is the use of a digital servo control circuit 26 to control the operation of the carriage servo motor 22 and the print wheel servo motor 24. Since identical circuits 26 are used to drive the two servo motors, the details of only one of the circuits 26 is shown in the drawings.

As it is shown in FIG. 1, directly connected to the drive shaft of each servo motor 22 and 24 is a transparent disc 90, which is located closely adjacent and parallel to a stationary transparent disc segment 93. Both the disc 90 and disc segment 93 carry evenly-spaced opaque timing marks 92 at their edges. A lamp and photocell combination 94 is used as a sensor to detect the movement and position of the disc 90. The sensor system consisting of disc 90, segment 93 and sensor 94 is well known. For example, such a system is used in the daisy-wheel printer which is made by Ricoh Co., Ltd. of Tokyo, Japan and sold in the U.S. The sensor 94 has two photocells separated slightly from one another. The timing marks 90 are dimensioned so that the photocells produce two sine waves, such as those shown at 89 and 91 in FIG. 3. The waves 89 and 91 are 90° out of phase from one another, and the period of each wave is d, where d is the distance between adjacent marks 92 (see FIG. 1) and 2d is the spacing between adjacent spokes of the print wheel 14.

The movement of the carriage from one position to the next, and the movement of the print wheel from one position to the next preferably is accomplished in two different modes, as it is well known to do in the prior art (see, for example, U.S. Pat. No. 4,021,650). For the sake of simplicity, the following will describe only the control of the rotation of the print wheel 14, although it should be remembered that the same description also applies to the linear movement of the carriage 15.

Figure 9:
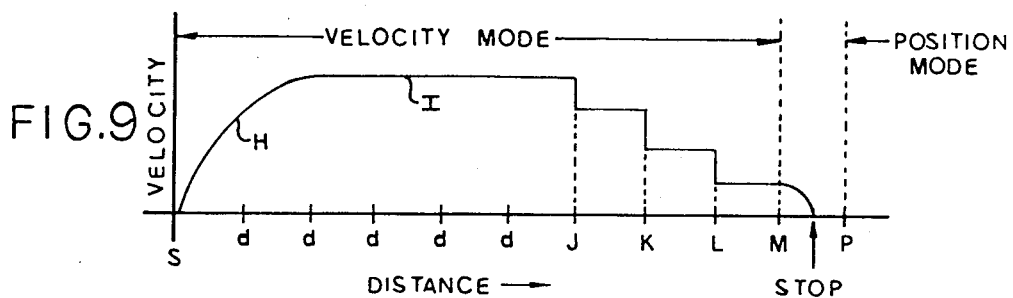
FIG. 9 is a graph illustrating the operation of the system of FIG. 1.

FIG. 9 illustrates a typical movement of the print wheel 14 from a starting point "S" to a "STOP" position. The first mode of movement of the print wheel is the "velocity" mode, and the second is the "position" mode. The velocity mode lasts from the starting point S until the wheel reaches a position M which is a distance $\frac{1}{4}$d from the STOP position, at which point the "position" mode starts. The system operates in the "position" mode during movement from point M to the STOP point, and for a distance $\frac{3}{4}$d on either side of the STOP position if there is overshoot or oscillation.

During the "velocity" mode, desired velocity signals are developed by the microprocessor 10. The desired velocity signals correspond to the optimum instantaneous velocities at each point d for the print wheel to enable it to reach STOP in the shortest time. The desired velocity values preferably are stored in a read-only memory which forms a part of the microprocessor 10. Every time an incremental distance "d" is traveled; that is, once every cycle of the timing signal wave 89 (see FIG. 3) a desired velocity value is read out of the memory. Further details of this feature of the system are not necessary to describe here since they are well known. Of course, as also is well known, counters, not shown, are provided in order to keep track of the distance the print wheel has to go to reach its final destination. As the print wheel nears the STOP point, the desired velocity values decrease, causing the servo motor 24 to decelerate and slow down as indicated at points J, K and L in FIG. 9.

The microprocessor 10 is programmed to indicate whether braking or acceleration is needed to either accelerate or decelerate the print wheel. This also is done once every unit space d. The microprocessor 10 also is programmed to determine when it is time to switch into the "position" mode, and it sends a timing signal at that instant.

Referring again to FIG. 1, during the operation of the digital servo control circuit 26, control signals from the microprocessor unit are delivered over the data bus 38 to an output port device 76. The output port device delivers, on line 104, a signal indicating whether clockwise or counterclockwise rotation of the servo motor is required. On line 106 is delivered a signal indicating whether the servo motor is to accelerate or brake, and on line 114 is delivered a mode selection signal indicating whether the "velocity" or "position" mode of operation is selected.

The signals on lines 104 and 106 are delivered to a direction control logic circuit 112 which converts the signals on lines 104 and 106 to signals on either line 116 or 117, depending upon the direction in which the servo is to be driven. The signal on either line 116 or 117 is delivered to a position detent circuit 78, and then to a voltage-to-current converter circuit 80 which energizes the servo motor.

The mode selection signal on line 114 also is delivered to the position detent circuit 78. The position detent circuit will be described in greater detail below. In general, it serves the function of controlling the motion of the print wheel during the "position" mode of operation, and corrects for overshooting or reverse oscillation away from the STOP position, and brings the print wheel to the STOP position with precision.

The output of the photocell detector unit 94 is delivered to a sensor receiver unit 96. The sensor receiver circuit 96, which is of conventional construction, shapes and amplifies the signals it receives and delivers them to the position detent circuit 78, as well as to an output line 98. The timing signals on line 98 serve to reset a counter 100 and to enable a latch circuit 102, as it will be described in greater detail below.

In FIG. 1, within the dashed outline 82, are shown two programmable square-wave generators 84 and 86, and a programmable one-shot multivibrator circuit 88. Each of these circuits is digital in nature, and preferably forms a portion of a single integrated circuit device such as the No. 8253 device manufactured by Intel Corporation.

The square wave generator 84 receives from the microprocessor 10, by way of data bus 38, an input signal representing the desired velocity $V_2$ for the print wheel. The device 84 is programmed by the input signal so that it produces a square wave output signal on line 85 whose period P is given by the following equation:

$$P = (1/32)(d/V_2) \tag{1}$$

in which $V_2$ is the desired velocity and d is the distance between adjacent timing lines 92 on the sensor wheel, a distance equal to one-half of the spacing between adjacent print wheel type elements or "petals".

The counter 100 is designed to count from zero to 63 and is used to sense the difference between the desired velocity $V_2$ and the actual velocity $V_1$ of the print wheel. The period of the wave received on the line 98 for resetting the counter is proportional to the actual velocity $V_1$. Therefore, the count on the counter 100 is described by the following equation:

$$C = 32(V_2/V_1) \tag{2}$$

where C is the count on counter 100 and $V_1$ and $V_2$ are defined above.

Thus, it can be seen that when $V_1$ equals $V_2$, the count on the counter will be 32. When the desired velocity $V_2$ is greater than the actual velocity $V_1$, then an error signal will be developed which is proportional to the difference between 32 and the count developed. Similarly, if $V_2$ is less than $V_1$, an error signal of opposite polarity will be developed in the counter 100.

The reset signal delivered on line 98 not only resets the counter 100, but it also causes the output of the counter to be stored by the latching circuit 102. The data in the latch 102 is transmitted over the data buss 38 to a specially reserved section of the read-only memory 34 which stores the values of acceleration necessary, for each digital error signal, to change the actual velocity $V_1$ to the desired velocity $V_2$ within the time interval between successive timing lines 92. Thus, for each digital error signal, a value of acceleration or deceleration is read out of the memory 34 and is delivered over the data bus 38 to the programmable one-shot multivibrator 88 where it is used to modify the time duration of the rectangular wave output pulse ("b") which is delivered to the position detent circuit 78.

The acceleration/deceleration data is stored in what is, in effect, a first look-up table. It should be understood that this data alternatively could be stored in a separate memory device such as a discrete ROM or RAM, but that it is more economical to store it in a reserved section of the ROM 34 which also is used for other purposes.

Applicant has recognized that the values of acceleration from the first table often require modification depending upon the level of the desired velocity $V_2$. Thus, another reserved section of the ROM 34 is used as a second look up table to provide multiplication coefficients by which the values from the first table are multiplied in order to give the corrected acceleration value for the servo motor 24.

The values from the second table are delivered to the programmable square-wave generator 86 whose output "a" is used as a trigger for the one-shot multivibrator 88. By this means the scale coefficients from the second table are used to vary the output frequency of the square wave output from the generator 86. Typical waveforms for the signals "a" and "b" are shown in FIG. 4. The repetition rate of the signal "a" as well as the time duration "x" of the output "b" of the one-shot circuit together determine the "duty cycle" of the signal delivered to the voltage-to-current converter 80, and thus determine the magnitude of the current delivered to the print wheel servo motor. The term "duty cycle", as it is used in this description, is the product of the pulse duration and repetition rate, and is a measure of the power delivered to the servo motors.

Figure 5:
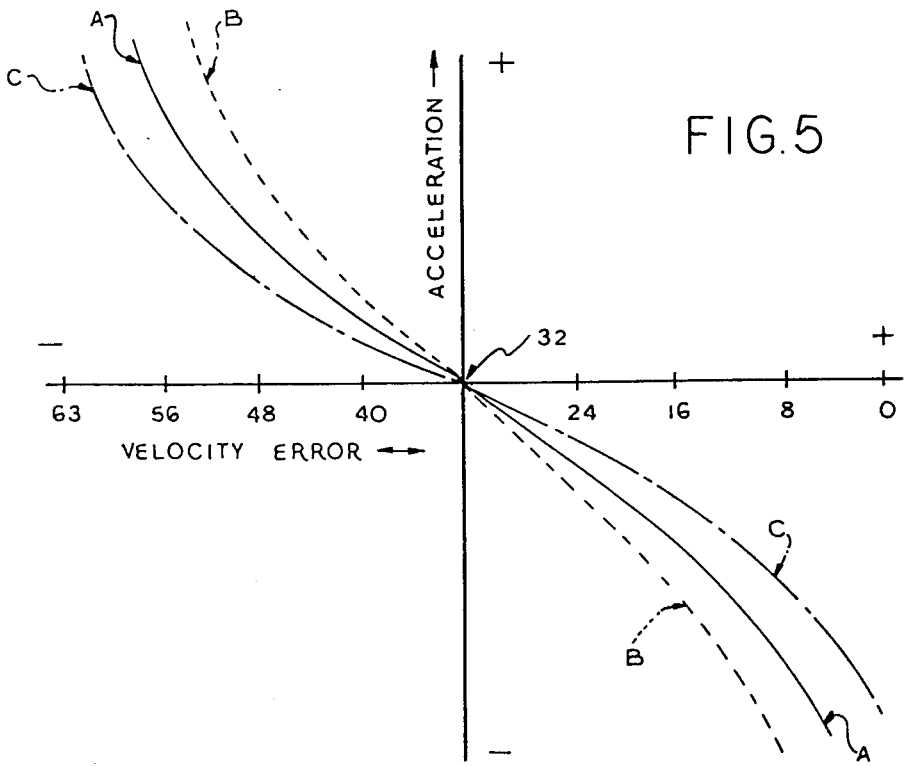
FIG. 5 is a graph illustrating an operational feature of the system shown in FIG. 1.

FIG. 5 shows the qualitative relationship between the acceleration values stored in the first table as a function of the velocity error signal. As it can be seen, actually there is a family of different curves. The curve A is one in which the desired velocity is of intermediate magnitude, whereas curve B applies to relatively high velocities, and curve C applies to relatively low velocities.

The equation describing the variation of acceleration with velocity error values; i.e., the equation describing the curves of FIG. 5, is set forth below:

$$A = \frac{d}{2T_2^2}\left(\frac{X^2 - 1}{X^2}\right). \tag{3}$$

in which A is the acceleration; d is the distance between adjacent timing marks on the disc; $T_2$ is the desired time between corrections $$\left(T_2 = \frac{d}{V_2}\right);$$

and $X = (T_1/T_2)$, where $T_1$ is the actual time between corrections $$\left(T_1 = \frac{d}{V_1}\right).$$

The values stored in the first look-up table are directly proportional to $$\left(\frac{X^2 - 1}{X^2}\right),$$

and the scaling factors stored in the second look-up table are directly proportional to $$\left(\frac{d}{2T_2^2}\right).$$

Because of the physical differences between driving the print wheel 14 and driving the carriage 14, there are two separate look-up tables for each of these different devices. In other words, there are two separate areas of the ROM 34 in which acceleration values are stored, and two other separate areas for storing scaling factors.

The above-described digital servo control circuit 26 operates so quickly that there is more than ample time between adjacent timing signals to complete its operation. For example, the minimum time separation between adjacent timing marks 92 is approximately 200 to 250 microseconds, and the time of operation of the servo control circuit 26 is around 50 microseconds.

The timing signal on line 98 also is delivered as a pulse wheel interrupt signal (PWI) to the microprocessor unit 10. Similarly, a sensor signal is delivered periodically over line CI to a carriage interrupt line input to the microprocessor 10. The delivery of these signals starts the interrupt sequences in a well-known manner which need not be described here. Each interrupt sequence is described by the flow chart in FIG. 8.

Referring now to FIG. 8, the microprocessor 10 first decrements the distance which the print wheel has to go before reaching its desired position. If this distance is zero, then the detent circuit is activated to bring the print wheel to its desired location, as it will be described in greater detail below. However, if the distance to go is not zero, then the error stored in the latch 102 is read.

Depending upon whether the count stored in latch 102 is greater or less than 32, the decision is made whether braking is needed or not. Next, the acceleration value from the first error table in the ROM 34 is fetched and supplied as an input to the one shot multivibrator circuit 88.

Next, a determination is made whether this is a point where velocity should decrease. If it is determined that it is a point at which the velocity should decrease, then the scaling factor for the desired velocity is looked up from the second table in the ROM 34. This is output to the square wave generator 86 to modify the duty cycle of the wave produced by the one shot multivibrator 88. Of course, after each of the three possible actions during the interrupt sequence, a return signal is generated and the system returns to the sequence shown in FIG. 7.

POSITION DETENT CIRCUIT

FIG. 2 shows in detail the output port 76, direction control logic circuit 112 and position detent circuit 78. The output port 76 is of conventional construction. Preferably, it is an integrated circuit eight-bit latch device wich holds the data until it is no longer needed.

The output port has the three output leads 104, 106 and 114 to operate the digital servo control circuit 26 associated with the print wheel servo motor 24. The latch 76 also is used as an output port for the digital servo control circuit used in connection with the carriage servo motor 22. For this purpose, three additional leads 118 are provided. Since the detent circuitry for the carriage is substantially identical to that for the print wheel, a detailed description of only the print wheel detent circuit will be given.

The direction control logic converts the counterclockwise/clockwise and acceleration/brake signals on lines 104 and 106 in into a d.c. signal on one of two output leads 116 or 117, depending upon the direction that the servo motor is to be driven. The output signal "b" from the multivibrator 88 is inverted by an inverter 108 and delivered to one input of an AND gate 110. The mode selection signal on the line 114 is delivered to the other input of the gate 110. During the velocity phase of operation, the mode selection signal on line 114 enables the gate 110 so that the duty-cycle controlled signals from the multivibrator 88 are conducted to one lead of each of two OR gates 126 and 128. Depending upon the direction in which the servo motor 24 is to be driven, one or the other of the OR gates 126 and 128 is enabled to deliver the duty-cycle controlled signals to one or the other of the output leads 116 or 117.

The counterclockwise/clockwise signal on line 104 is inverted by an inverter 120 and sent to one input lead of a first exclusive OR gate 122. The uninverted signal is sent to one input of a second exclusive OR gate 124. The brake/accelerate signal on line 106 is fed to the other input lead of the two gates 122 and 124. The output of the latter gates will be "high" only if both inputs have the same state; i.e., both inputs are "high", or both are "low". By means of this circuit, the output of only one of the gates 122, 124 will be high. The outputs of each of the latter gates is delivered to one input of one of the gates 126, 128, so that only one gate 126, 128 is enabled at a given time.

The signal on line 116 is delivered to a field-effect transistor switch ("FET" switch) 130. This switch connects an adjustable d.c. voltage source 134 to an output lead 131. Similarly, the line 117 is connected to a FET switch 132 which, when actuated, applies a d.c. signal of opposite polarity from a supply 136 to an output lead 133. The pulses on either line 131 or line 133 are delivered to a resistor-capacitor combination 138, 140 which acts as an integrator, smooths the pulses and delivers a corresponding d.c. voltage signal to a conventional voltage to-current converter 80 which delivers a corresponding d.c. current to the servo motor 24.

When the signal level on line 114 changes to switch the servo motor from the "velocity" mode to the "position" mode, gate 110 is disabled. At the same time, this change of state also turns on two FET switches 142 and 144. Switch 142 is turned on to short circuit the drive signals on lines 131 and 133, and switch 144 closes to connect the detent circuit to the input of the voltage-to-current converter 80. In other words, the signal on line 114 enables the detent circuit and disables the servo drive circuit.

Referring now to FIG. 3, the servo control system is designed so that the STOP point for the carriage or print wheel is located at the zero crossing point in the wave 89. The distance from the peak M of that wave to the zero point in that wave is equal to one-fourth of the distance d between adjacent timing marks on the timing wheel.

Referring again to FIG. 2, the wave 89 is applied to the input of a FET switch 146, the operation of which is controlled by the signal "d" on line 147. Referring again to FIG. 3, the "d" signal has a rectangular waveform. It is formed by clipping and shaping the signal 91 which lags wave 89 by 90°. Thus, the "d" signal starts at the point "M", and drops to zero again at the point P. Thus, its duration extends over 180° of the wave 89.

When the switch 146 is enabled by the "d" signal on line 147, and the servo system switches into the "position" mode of operation, the signal 89 is delivered through a sample-and-hold circuit which is composed of a capacitor 150 and a differential operational amplifier 148, through a low-pass noise filter consisting of a resistor 152 and a capacitor 154, to a junction 163. The signal 89 also is delivered to a differentiating circuit consisting of a capacitor 156 and a resistor 162. The output of the differentiating circuit is amplified by an amplifier circuit 160 and delivered to the junction 163 where the amplified differential signal is added to the signal 89. The sample and hold circuit has no effect on the circuit at this time because the switch 146 is turned on and the circuit is in its "sample" mode.

As it is well known, the differential of the signal 89 in the section between points M and P is of a polarity tending to reverse the direction of the servo motor 24. The portion of signal 89 between STOP and point P also tends to reverse the motor. These signals urge the servo back towards the desired STOP position if the motor overshoots that position by a distance of ¼d or less.

If the motor travels too far in the opposite direction, the portion of wave 89 between M and STOP will drive the servo back again towards STOP.

A problem arises in the above system, and in the prior art systems, when the motor overshoots by more than 90° past point P, or oscillates more than 90° back past point M. In either case, the drive signals developed by the time derivative of wave 89 tend to move the motor away from the STOP position. This causes inaccuracies in the placement of printed characters and results in unattractive or unreadable printing.

In accordance with another feature of this invention, the foregoing problem is relieved substantially by the use of the sample-and-hold circuit. When the motor moves past either point M or point P, the signal "d" enabling the FET switch 146 turns off. This causes the sample-and-hold circuit to switch into its "hold" mode and hold the voltage applied to it just prior to the turn-off of switch 146. This voltage is of a polarity tending to return the motor to the STOP position, and has the peak magnitude of the wave 89. The circuit will correct overshoot and reversals ("undershoot") of up to 270° past the STOP position in either direction. Therefore, the system will correct for overshoot or undershoot over a 540° range, a substantial improvement over the 180° range available without the use of the invention.

STEPPING MOTOR DRIVE CIRCUIT

Figure 6:
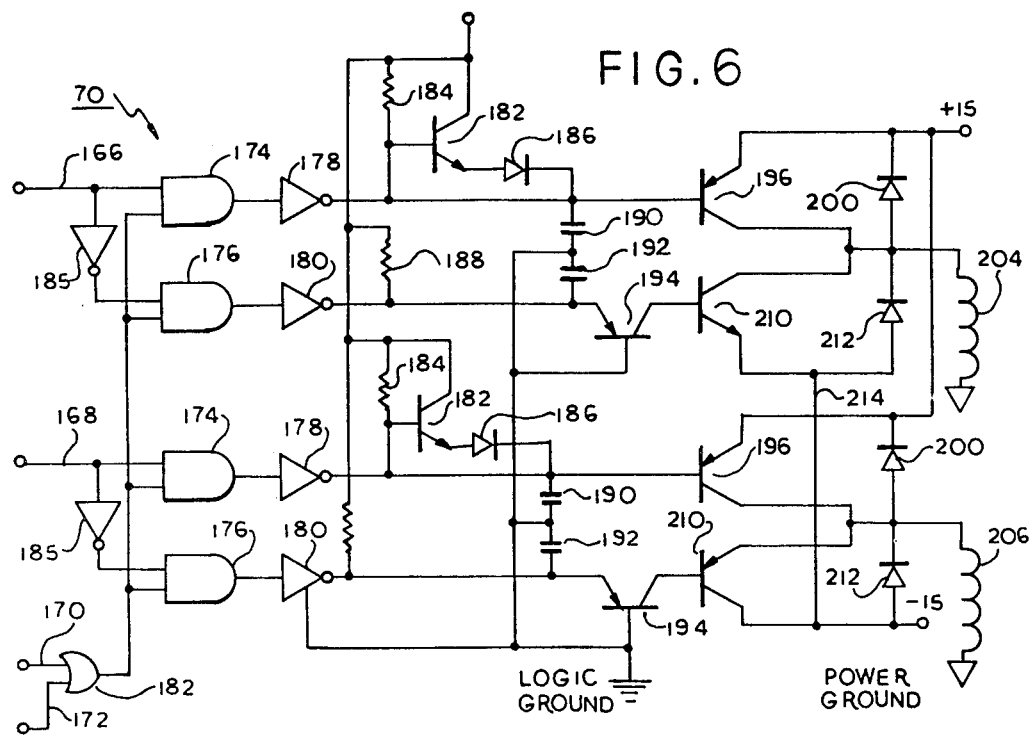
FIG. 6 is a detailed schematic circuit diagram of another portion of the system shown in FIG. 1.

FIG. 6 shows the power-saving drive circuit which is used to drive the two windings 204 and 206 of the two-phase stepping motors 18 and 20 shown in FIG. 1.

When it is desired to drive either stepping motor for line feed or ribbon feed, standard two-phase stepping motor drive signals are applied to the input leads 166 and 168. These signals are transmitted, respectively, to two pairs of AND gates 174 and 176, there being one pair of gates for each of the input leads 166 and 168. The second AND gate 176 of each pair receives an inverted drive signal by way of an inverter 185. At the same time, on another input lead 170, there is applied a d.c. signal which enables each of the gates 174 and 176 through an OR gate 182.

The output of each AND gate 174 and 176 is delivered to an inverter 178 and 180 and thence to a power transistor 196 or 210, depending upon the state of the input signal on line 166 or 168. Thus, each transition of the wave on either of the lines 166 or 168 causes one step of the stepper motor, in a manner well known in the art. Diodes 200 and 212 are connected as shown in the circuit to shunt the fly-back voltage of windings 204 and 206 to the power supply.

A transistor 194 is connected to the base of each of the transistors 210 to shift the on-off control signal from inverter 180 to the level required by transistors 210 to turn them on and off. Capacitors 190 and 192, resistors 188, and a capacitor discharge circuit including transistor 182, diode 186 and resistor 184, are provided in order to delay the turn-on of one transistor while the other transistor of each pair 196 and 210 is being turned off, thus preventing both transistors from being turned on simultaneously and avoiding this as a cause of transistor burnout.

During the time when the stepping motors are not being driven, they require a steady-state holding current to hold them in the positions at which they are set. Otherwise, they are likely to drift and cause misalignment of the characters or other undesirable printing results. In the past, it has been customary to energize the power transistors 196 and 210 in a manner such that they operate in the linear range of their operation. Applicant has recognized this as a source of inefficient operation and heat generation.

In accordance with a further feature of the invention, the holding current signal supplied to the transistors 196 and 210 is pulsating rather than steady. The peaks of the voltage pulses are high enough so that the transistors 196 and 210 are driven to saturation. Thus, while each transistor 196 and 210 is turned on, it is fully conducting and suffers very little voltage drop or power loss. The transistors 196 and 210 are turned off between peaks, and the current through them is zero, thus eliminating all voltage drop or power loss at these times.

The frequency of the holding signal pulses is high enough so that the windings of the stepping motor act as smoothing coils and convert the pulsating signals into effective d.c. holding currents.

Since the transistors operate with maximum efficiency, there is substantially less wasted electrical energy and less heat to dissipate from the transistors. Since heat tends to destroy semiconductor devices, the life of the devices and the reliability of the printer are considerably improved by the reduction in operating temperature. Further benefits are realized due to the reduction in electric power costs, reduction in size, and reduction in cost of the printer's power supply due to the reduced power demands of the stepping motors and solenoids of the printer.

Applicant has recognized that the savings in power and reduction in heating in the line and ribbon feed motor operation which are created by the above feature of the invention can be especially significant because the ribbon and line feed motors in the printer often operate for only a relatively small percentage of the total time that the machine is operating. Therefore, the holding mode of operation often is predominant, and the importance of the improvement provided by this feature of the invention is enhanced.

RIBBON AND PRINT-WHEEL SHIFT SOLENOID ENERGIZATION

Applicant has recognized that a problem similar to that with the stepping motors exists in the operation of the solenoids for the ribbon shift and print wheel shift mechanisms. Each shift mechanism includes a solenoid which is driven by a drive circuit 52 or 54 (FIG. 1). In one of the positions of the solenoid, it must be held by means of electromagnetic force. Thus, each solenoid requires a steady-state holding current.

In accordance with the present invention, each driver circuit 52 and 54 provides a pulsating drive signal to operate the power transistors used to energize the solenoid, thus improving the efficiency of operation of the transistors and reducing the power consumption and heat dissipation of the circuit. This further lowers operating and manufacturing costs, and increases the reliability of the printer.

Figure 11:
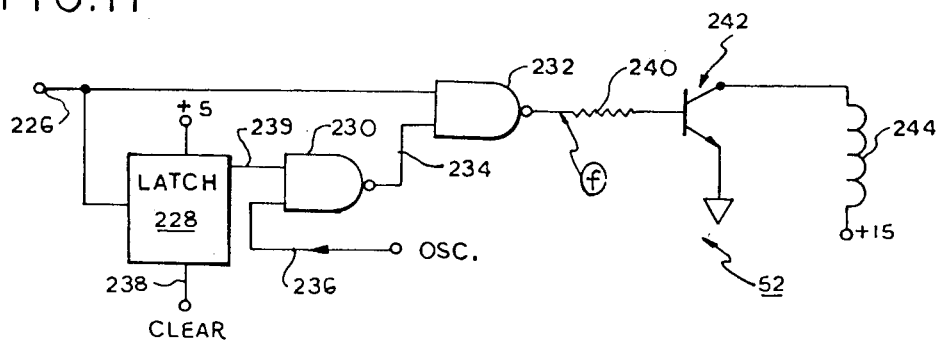

A preferred drive circuit 52 for the ribbon shift solenoid 244 is shown in FIG. 11. At the time when it is desired to lift the ribbon (to change from red to black ribbon, e.g.), a d.c. drive signal is delivered to the input terminal 226 of the circuit 52. This drive signal is applied to one input of an AND gate 232 whose output signal "f" is delivered to the base lead of a power transistor 242 through a current-limiting resistor 240. The power transistor supplies lifting current to the solenoid 244.

An oscillator supplies a pulsating signal to one input 236 of another AND gate 230 whose output is applied to the other input lead 234 of the gate 232.

The d.c. drive signal is applied to the input of a flip-flop latch circuit 228 whose output lead 239 then changes state and enables the gate 230 to deliver the oscillator output to the gate 232. The latch stays in this condition until the microprocessor delivers a "clear" signal on the "clear" line 238 of the latch device to de-energize the solenoid 244.

Figure 12:
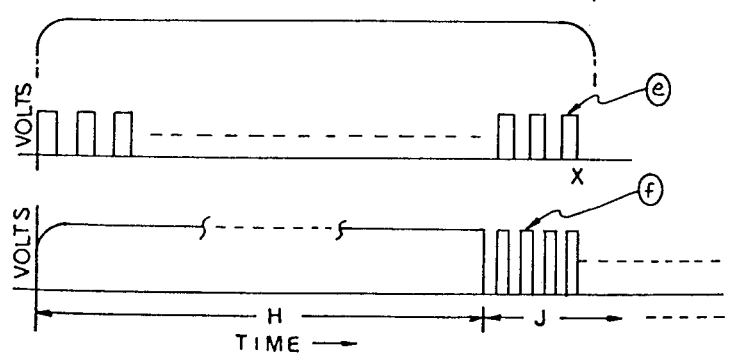
FIG. 12 is a waveform diagram further illustrating the operation of the system of FIG. 1.

The waveform of the signal "f" applied to the base lead of the transistor 242 is shown in FIG. 12. The initial portion labeled "H" is the d.c. drive signal. It has a duration of about 25 milliseconds. This portion of the signal is used to apply maximum energy to the solenoid to lift the ribbon.

After the H portion of the wave, the oscillator signal is delivered to the base lead of the transistor 242 to produce a holding signal portion J which is pulsating at a rate of about 16.6 kilohertz. The peaks of the pulsating portion J are high enough to drive the power transistor 242 into saturation, thus operating that transistor at maximum efficiency while holding the ribbon in its lifted position.

The frequency of the holding signal is high enough so that the solenoid coil smooths the signal, but not so high that the coil impedance becomes excessive and limits the coil current too much.

The print wheel 14 is of the variety in which there are two separate type elements 58 and 60 (FIG. 1) for each spoke. A print wheel of this type is used in the printer made by Ricoh Co. Ltd. of Tokyo, Japan, and which is sold in the U.S. This arrangement forms two separate concentric rows of type elements. These elements may be used to provide upper and lower case characters, upper case being in one row and lower case being in the other, thus permitting a reduction of the usual number of "petals" or spokes in the wheel. Alternatively, the two different rows of type characters can be used to provide two different type faces on the same print wheel, without a reduction of the number of spokes. Thus, the print wheel shifting is for the purpose of selecting between the two concentric rows of characters.

The drive circuit 54 for the print wheel shift solenoid is identical to the circuit 52, except that it actually contains two solenoids and two circuits 52. The reason for this is that the preferred print wheel actually has a mechanical detent which normally positions the print wheel 14 at a location half-way between the two extreme positions, so that one solenoid must be used to select one row of type characters, and the other solenoid to select the other row.

HAMMER DRIVE CIRCUIT

It is well known that the intensity or the impact of the hammer on the type member 58 or 60 should vary with different type sizes and styles in order to give relatively uniform blackness or density of the printed characters. In general, the greater the surface area of the character, the greater the impact should be, and vice-versa.

Figure 10:
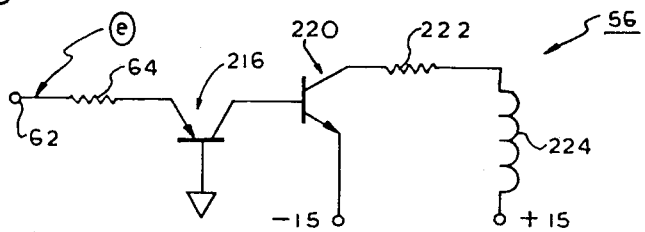
FIGS. 10 and 11 are detailed schematic circuit diagrams of additional portions of the system of FIG. 1.

Referring now to FIG. 10, in accordance with the present invention, the micro processor delivers a hammer drive signal "e" (FIG. 12) to terminal 62 of the hammer drive circuit 56. This signal passes through a first current-limiting resistor 64 and a base drive transistor 216 to the base lead of a power transistor 220 which delivers current to the hammer drive solenoid 224.

Values of hammer intensity are stored in memory for each character. If different values are necessary for characters of a different style, then new values are stored in memory for the new style. These values then are used by the microprocessor 10 (FIG. 1) to produce a pulsating output signal whose pulses vary in width with the stored hammer intensity values. This is the signal "e". It is readily evident that a variable duty-cycle signal such as "e" can be developed by the same means as that which is described hereinabove for producing the variable duty-cycle signal "b" of FIG. 4. In this manner, the hammer intensity is varied digitally by varying the duty cycle of the energizing signal. This avoids the use of power-consuming resistor networks as are used for selecting the hammer intensity in some prior art devices. Also, the power transistor 220 is operated at or near peak efficiency, in the same manner as the other solenoids.

In accordance with another feature of the invention, as it is illustrated in FIG. 12, the time duration of the drive signal "e" is made to coincide approximately with the "dwell time" of the hammer; that is, the time during which the hammer is in contact with the ribbon and paper. Furthermore, the frequency of the drive signal "f" is made high enough so that a substantial number, e.g. 20, cycles will will occur during the hammer dwell time. This ensures that the driving force will be applied relatively evenly during the entire time when the hammer is in contact with the ribbon. Also, as with the other solenoids, the frequency of the drive signal is selected so that the solenoid winding acts as a choke coil and smooths the waveform, without being so high that the winding impedance becomes excessive and limits the winding current too much.

The above description of the invention is intended to be illustrative and not limiting. Various changes or modifications in the embodiments described may occur to those skilled in the art and these can be made without departing from the spirit or scope of the invention.

I claim:

1. In a printer having an electromagnet for driving a print hammer, means for energizing said electromagnet with a pulsating electrical drive signal, the duty cycle of said drive signal being set to produce a hammer impact of a predetermined magnitude, the dwell time of said hammer being substantially greater than the period of said drive signal.

2. A device as in claim 1 including digital data storage means for storing different values of hammer impact for different characters to be printed, means for reading said values out of said storage means in response to code signals representative of said characters, and regulating means for regulating said duty cycle in accordance with said values.

3. A device as in claim 2 in which said regulating means includes means for varying the pulse width of said drive signal.

4. A device as in claim 1 including a power semiconductor device for conducting electrical energy to said electromagnet, the peaks of said pulsating drive signal being of a magnitude sufficient to operate said semiconductor device in a saturated mode, the frequency of said drive signal being sufficient to utilize the winding of said electromagnet as a smoothing coil to smooth said pulsating signal.

* * * * *